united States Patent [19]
Lopker

[11] 3,802,846
[45] Apr. 9, 1974

[54] CRYSTALLIZER APPARATUS
[75] Inventor: Edwin B. Lopker, Ft. Lauderdale, Fla.
[73] Assignee: Pullman Incorporated, Houston, Tex.
[22] Filed: May 21, 1971
[21] Appl. No.: 145,805

[52] U.S. Cl.................... 23/273, 423/320, 23/259.2
[51] Int. Cl......................... B01d 9/00, C01b 25/16
[58] Field of Search .......... 23/165, 122, 273, 259.2; 159/45

[56] References Cited
UNITED STATES PATENTS

| 3,522,003 | 7/1970 | Lopker | 23/165 |
| 3,522,004 | 7/1970 | Lopker | 23/165 |
| 2,035,441 | 3/1936 | Allen et al. | 159/45 |
| 3,309,177 | 3/1967 | Goerg | 23/273 |
| 2,819,154 | 1/1958 | Frejacques | 23/273 |
| 3,168,431 | 2/1965 | Spielvogel | 159/37 |
| 2,091,898 | 8/1937 | Weber | 23/165 X |

Primary Examiner—Oscar R. Vertiz
Assistant Examiner—Gregory A. Heller

[57] ABSTRACT

Apparatus for the production of crystals from a liquid or for carrying out reactions in which precipitation of a by-product from a liquid occurs, comprises a substantially cylindrical reactor vessel, the bottom portion of which is cone-shaped with the apex of the cone positioned upwardly. A slurry consisting of a liquid portion and a solids portion of precipitated crystals is passed through the vessel and a portion thereof is withdrawn from at or near the bottom of the vessel in a take-off conduit connected substantially tangentially to the circumference of the vessel. A rake mechanism may be provided to sweep the cone at a rate of speed equal to or slightly greater than the velocity of the circulating slurry in order to help preclude the settling out of solids from the slurry.

The process is carried out by introducing reactants into the vessel preferably at or near the top thereof, and most preferably in a direction substantially tangential to the circumference of the vessel. The slurry is maintained in substantially rotational, laminar flow passing generally from the top to the bottom of the vessel over the outer surface of and concentrically to the apex of an upwardly projecting cone.

6 Claims, 12 Drawing Figures

Fig. 1.

PRIOR ART

INVENTOR.
EDWIN B. LOPKER

INVENTOR.
EDWIN B. LOPKER

Fig. 4.

INVENTOR.
EDWIN B. LOPKER
BY
Meyer, Tilberry & Body
ATTORNEYS.

INVENTOR.
EDWIN B. LOPKER
BY
Meyer, Tilberry & Body
ATTORNEYS.

CRYSTALLIZER APPARATUS

DISCLOSURE

The present invention relates to process and apparatus for carrying out reactions which may broadly be described as crystallization processes, i.e., processes in which a solid is precipitated from a liquid or slurry.

The invention is particularly applicable to the production of phosphoric acid by what is commonly known as the "wet process" and will be described with particular reference thereto, although it will be appreciated that the invention has broader applications, such as crystallization processes in general. For example, the invention is applicable to producing ammonium salt crystals, such as ammonium sulfate, ammonium phosphate and the like.

Crystallization reactions may be generally defined as reactions involving a precipitate-forming reaction between constituents of a slurry of liquid and precipitated crystals, and requires means to adequately mix the reactants and to regulate the temperature of the reaction mixture. For example, in the case of wet process production of phosphoric acid, sulfuric acid and calcium phosphate rock are reacted to form phosphoric acid and calcium sulfate precipitate. As described in detail, for example, in my U.S. Pat. Nos. 3,522,003 and 3,522,004, assigned to the assignee of this application, the success of the process depends to a large degree on the formulation of calcium sulfate crystals which can be readily separated from the slurry and washed free of phosphate values. Crystal formation in turn depends upon reactant concentrations and temperature changes in the system. Generally, the growth of large, easily filterable crystals is enhanced by minimizing changes in concentration of the precipitate-forming reactants by thorough mixing of the reactants into slurry and by minimizing changes in temperature throughout the reactant mass.

Accordingly, crystallization reactions generally require:

(1) means to control mixing and circulating of the slurry through the system in order to avoid stagnant pockets and resultant unduly large reactant concentration gradients; and (2) heat exchange means to control temperature changes occasioned by exothermic or endothermic reactions.

The process and apparatus described in the aforementioned U.S. patents provide efficient and controlled mixing by maintaining the entire slurry mass at a high rate of generally rotational, laminar flow through the vessels instead of relying on the uncontrolled mixing attained by agitators placed within the slurry mass. The patents also show cooling the slurry by means of an evaporative cooler, through which the slurry mass is circulated.

It is well-known and quite common in the prior art to provide a crystallizer vessel, i.e., a vessel in which crystallization from the circulating liquid takes place, with a cone-shaped bottom, the apex of which is pointed downwardly, so that the lower portion of the vessel tapers to the outlet from which the crystal-containing slurry is withdrawn. The reason for this is that the crystals formed in the rotating liquid tend to form and to be retained in the center of the vessel, and in order to control crystal growth, these crystals must be maintained in motion throughout the system and not allowed to be "captured" or stagnate at any point.

This tendency for crystals to congregate in the center of a vessel of stirred or swirling liquid may be convincingly verified by observing that when a teaspoon of sugar is dropped into a beaker of cool water and stirred with a smooth, rotational motion the crystals, prior to dissolving, congregate in a generally conical-shaped mass in the vortex of the liquid at the center of the beaker. In crystallization reactions with a rotating slurry, the conical-shaped bottom of the vessel funnels the crystals downwardly and collection of slurry from the apex of the downwardly pointing cone precludes "capture" of the crystals in the crystallizer for an undue period of time.

The requirement for the cone-shaped extension of the vessel, however, results in a considerable increase in the height of the crystallizer vessel, with concomitant requirement for structural support and enclosure. For example, in a 500 ton per day wet process phosphoric acid plant, a crystallizer tank 30 feet in diameter would require a cone portion about 26 feet high. To this height must be added the height of the cylindrical portion of the tank required to contain the slurry, plus sufficient free board space. If an evaporative cooler is employed to cool the slurry as is often required, it must, for reasons explained hereinbelow, be positioned higher than the liquid level in the crystallizer tank. Accordingly, the required height of structural support, operator access and enclosure structures is increased which concomitantly increases the foundation strength requirements. Since the equipment for a large-scale plant, such as a 500 ton per day phosphoric acid plant, weighs on the order of several hundred tons, the cost of supporting the foundation structures is seen to be considerable.

Notwithstanding the obvious economic disadvantages of undue height of equipment, because of the necessity of carefully controlled conditions, including hydraulic conditions within the crystallizer, to satisfy the requirement that crystals of a suitable size and configuration be produced, cone bottom tanks are commonly employed as crystallizers in the prior art, particularly when a circulatory flow is employed within the crystallizer.

The present invention provides an apparatus and process for carrying out crystallization reactions wherein excellent hydraulic characteristics are obtained, i.e., good mixing of reactants and withdrawal of crystal solids in the slurry are obtained, in a structure which may be made considerably shorter than crystallizer apparatus in accordance with the prior art. An efficient, economical, generally shorter apparatus for a given capacity is provided, which gives excellent control of the crystallization process and is particularly adapted for use in systems which employ rotational circulation of slurry within the crystallizer vessel, although it is not limited to such.

In accordance with the present invention, there is provided a crystallization process wherein slurry is circulated through a crystallizer tank which has a cone-shaped surface projecting inwardly therein so that the crystals are diverted into a take-off conduit and are not captured at the center of the vessel, and a crystallization apparatus comprising a vessel with a cone-shaped surface extending inwardly into the vessel.

A preferred embodiment of the apparatus of the invention provides in effect a false bottom crystallizer vessel in which the cone-shaped bottom projects upwardly into the vessel from the bottom thereof, so that the slurry is contained in the bottom of the crystallizer vessel between the geometrically outer surface of the cone and the inside of the vessel, rather than, as in accordance with the prior art, within the geometrically inner surface of the cone. The cone-shaped surface may, and preferably is, a full cone with a pointed apex, but the cone may be truncated, and may be capped with a flat or curved surface. The cone may be supported at or form a part of the bottom of the crystallizer vessel, or it may be supported above the bottom. Finally, although a true cone surface is preferred, a geometrically perfect cone or truncated cone surface is not required, but a generally tapering, substantially cone-shaped surface will suffice. For example, the sides of the cone-shaped surface may change in pitch or angle at different sections of the cone. The word "cone" as used in the specification and claims shall mean and include all the foregoing variations.

The inwardly extending cone configuration not only reduces the overall height of the crystallizer vessel proper, but permits the slurry to be withdrawn from the vessel tangentially to the circumference thereof, and at an elevation not lower than the bottom of the crystallizer vessel. Thereby, a further reduction in overall height of the equipment is effected, since it is no longer necessary to withdraw the slurry from below the lowest portion of the crystallizer vessel, i.e., from below the apex of the externally, downwardly extending cone.

In general, any vessel in which precipitation of a solid occurs or through which slurried crystals pass may be considered a "crystallizer" which can benefit from the cone-shaped surface of the invention, even though the vessel may also serve other purposes, such as dissolving or cooling.

By projecting upwardly into the vessel, the cone of course reduces the capacity of a vessel of given diameter and height. It is therefore desirable from the point of view of maximum capacity of a vessel of given external dimensions that the cone project upwardly for as short a distance as possible. On the other hand, a certain minimum amount of projection is necessary to preclude the collection and suspension of crystals within the swirling vortex of slurry so that the crystals are timely removed from the crystallizer. Generally, it has been found that the minimum angle at which the sides of the cone should project upwardly into the vessel is not less than 30° from the horizontal. It has further been found that an angle of projection of 60° from the horizontal is generally the maximum required for efficient preclusion of undue crystal retention within the crystallizer. Therefore, in accordance with a limited aspect of the invention, the angle of projection of the cone sides from the horizontal is between 30° and 60° from the horizontal, and most preferably, is at 45° from the horizontal.

The efficiency of crystal dispersion into the takeoff conduit is thus seen to be a factor of the angle of projection of the cone upwardly into the vessel. Under certain circumstances, it may be desired to enhance the crystal circulation effect of the inwardly projecting cone in order to insure proper exposure of each crystal to the reactants contained in the liquid portion of the slurry, and to preclude the undue retention of crystals in the vessel. In such cases, it has been found advantageous to provide a rake, the arms of which are substantially coextensive with, and which pass over, the sides of the upwardly projecting cone. The purpose of the rake is to help keep the crystals in motion and to prevent their being "captured" within the vessel. Accordingly, the rake peripheral arm speed should be at least as great and preferably slightly greater than the peripheral speed of rotating slurry over the vessel cone projection. The rake speed should not be so much greater than the slurry speed, however, that the rake acts as an agitator, since to do so would cause a loss of control of reaction concentration gradients and would cause back mixing of reactants. Therefore, in accordance with yet another limited aspect of the invention, there is provided a rake which rotates at a peripheral speed approximately the same or slightly greater than the rotational speed of the slurry in the vessel in order to prevent settling out of solids from the slurry. By a rotational or peripheral velocity "slightly greater than" the rotational or peripheral velocity of the slurry is meant a rake speed not more than 110 percent of the rotational speed of the adjacent slurry.

The rake is thus seen to supplement the function performed by the cone which is to maintain the solids in a rotating portion of the slurry where they will be kept in movement rather than permitting them to congregate at the center of the vortex swirl where their progression through the laminar layers of flowing reactant is interrupted. The provision of a rake thus permits the use of a smaller cone and thereby provides a greater liquid capacity for a vessel of given external dimensions.

When an evaporative cooler is employed in conjunction with the crystallization process, the slurry is circulated from the crystallizer through the evaporator, a part of the liquid portion of the slurry is evaporated, which cools the slurry and in many processes serves to withdraw gases formed during the reaction. For example, in the manufacture of wet process phosphoric acid, in addition to evaporated water vapor, evolved fluorine-containing gases and carbon dioxide may be withdrawn from the system via the evaporative cooler. Since vacuum vessels must be made strong enough to withstand the pressure differential between the vacuum imposed thereon and the ambient atmospheric pressure, these vessels are considerably more expensive than vessels which are open to the atmosphere, which may generally be of thinner construction and need not conform to safety code specifications required of pressurized vessels.

Accordingly, the crystallizer is most economically operated at atmospheric pressure, with the result that the level of slurry is higher in the evaporator vessel than in the crystallizer vessel, due to the suction effect of the vacuum on the slurry. It is for this reason that the evaporator vessel must be positioned above the crystallizer vessel. Typically, for example in a wet process phosphoric acid plant, the level of slurry in the evaporator is about 15 to 20 feet above the level of slurry in the crystallizer, the 15 to 20 feet of slurry representing the pressure head differential between the vacuum and atmospheric pressure.

Accordingly, the overall height of the system is increased by the required amount of elevation of the vacuum evaporator above the crystallizer. It is therefore advantageous to position the evaporator at an elevation no higher than is necessary, and this may be accomplished, in accordance with a limited aspect of the invention, by positioning the evaporator so that the lower portion thereof is submerged beneath the level of the slurry in the crystallizer vessel.

In accordance with this limited aspect of the invention, the lower portion of the evaporator vessel rests upon the inwardly projecting sides of the cone. In this configuration, slots are provided in the lower portion of the evaporator vessel to permit passage of slurry from the evaporator vessel into the crystallizer. The level of slurry in the crystallizer serves as a pressure seal and, notwithstanding that the two vessels are effectively placed one within the other, the slurry liquid in the crystallizer is open to the atmosphere so that only the evaporator vessel need be maintained under vacuum.

The foregoing configuration, however, tends to release slurry from the evaporator vessel radially outward and into the swirling circumferentially moving slurry within the crystallizer, tending to disrupt the laminar, helical flow of reactants. In order to overcome this, and in accordance with a limited aspect of the invention, louvers are positioned within the slotted openings at the bottom of the evaporator vessel in order to direct slurry emerging from the evaporator vessel into laminar, circumferential flow. The louvers effectively introduce slurry from the evaporator into the crystallizer vessel tangentially to a circle whose diameter is smaller than the diameter of the crystallizer and concentric with the center of said crystallizer.

However, it was found that passing the slurry directly from the evaporator or cooler vessel into the dissolver vessel, without a connecting conduit therebetween, resulted in excessive vortexing of the slurry in the cooler vessel which was not overcome by the cone bottom which was provided therein. That is to say, the slurry swirling downwardly in helical laminar flow in the relatively narrow evaporator or cooler vessel and, passing directly therefrom via circumferential slots in the bottom thereof, tends to form an excessively strong vortex within the evaporator vessel itself, resulting in the same problem of undue crystal retention which is avoided in the crystallizer by provision of the cone bottom. In addition, the extremely strong vortex may extend downwardly toward the cone bottom of the evaporator to such a distance that the pressure head of the column of slurry sustained by the vacuum in the evaporator is reduced. This reduction in head may result in an upward flow of slurry from the crystallizer to the evaporator with consequent undesirable increase in slurry height. If the loss of head is extreme, air may be sucked into the evaporator through the conduit that joins the crystallizer and the evaporator. This vortex extension in the evaporator is overcome by providing a swirl-breaker or vortex-breaker at an intermediate location in the evaporator vessel, the swirl-breaker preferably consisting of cruciform vertical plates extending across the diameter of an intermediate section of the evaporator.

In accordance with another limited aspect of the invention, therefore, a swirl-breaker is provided in the evaporator vessel.

The rotational velocity of the slurry over the inverted cone surface was also found to result in interference with the suction of the pump withdrawing slurry from the crystallizer bottom. In accordance with another limited aspect of the invention, this may be overcome by providing an expanded takeoff conduit through which the pump suction acts.

Alternatively, and in accordance with another limited aspect of the present invention, the bottom of the evaporator vessel may, instead of being placed directly upon the upwardly extending cone of the crystallizer vessel, be provided with its own upwardly extending cone which need not be contiguous with the cone of the crystallizer vessel. In such case, the cone of the crystallizer vessel will be truncated and the truncated portion extended upwardly to form the base of the evaporator cone bottom. The two cones will thus cooperate to avoid undue crystal retention within the combined vessels.

Although the present invention provides the very great advantage of considerably reducing the overall height of the crystallizer system, there is nonetheless, a loss of capacity of the dissolver vessel of given external dimensions by reason of the inwardly extending cone. This capacity loss may be compensated for in a vessel of given height by increasing the diameter, and it has been found not always necessary to increase the diameter of the upwardly projecting cone proportionately. Therefore, in accordance with a limited aspect of the invention, the diameter of the inwardly projecting cone is not proportionately increased with the diameter of the dissolver vessel, so that an annular, flat bottom portion is formed between the base of the inwardly extending cone and the outer dimension of the bottom of the crystallizer vessel. This annular space also provides a slurry takeoff point between the cone and the wall of the crystallizer, which also tends to overcome interference with the suction of the pump withdrawing slurry which might otherwise occur as described above.

Alternatively, or in addition, the diameter of the upper portion of the crystallizer vessel may be increased in relation to the diameter of the lower portion thereof, which is particularly advantageous since it increases the capacity of the crystallizer vessel to accommodate in its upper portion slurry which drains down from the evaporator vessel upon shut-down of the equipment. The increased diameter of the upper portion of the crystallizer conveniently accommodates the extra quantity of slurry which is released from the evaporator upon removal of the vacuum.

In accordance with yet another limited aspect of the invention, and as an alternate to positioning the lower portion of the evaporator within the crystallizer vessel, the evaporator is positioned above the crystallizer vessel and provided with a down leg or conduit extending from the bottom of the evaporator to beneath the level of slurry in the crystallizer vessel, and this evaporator down leg is provided with an internal, helical screw of gradually decreasing pitch in the direction of the slurry flow. The helical screw serves to increase the rotational velocity of the slurry traveling downwardly through the down leg and introduces it into the crystallizer vessel in a swirling, rotational motion so as to assist in providing and maintaining the laminar, rotational flow of slurry through the crystallizer vessel.

The invention may take physical form in certain parts and arrangements of parts, specific embodiments of which are described in detail in the following portion of the specification and illustrated in the accompanying drawings which form a part hereof and wherein.

Figure 1:
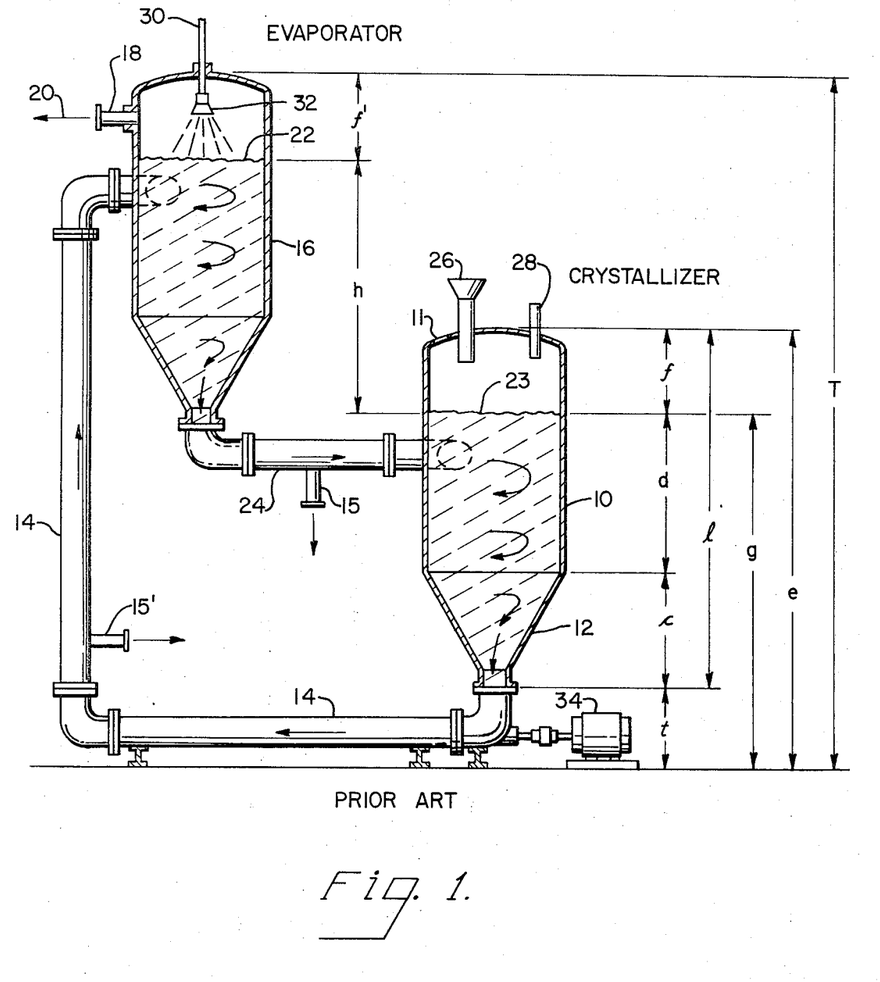
FIG. 1 is a schematic elevation view of an apparatus in accordance with the prior art.

Referring now to FIG. 1 there is shown an apparatus in accordance with the prior art adapted to carry out crystallization processes and particularly adapted to carry out the wet process for the production of phosphoric acid. A cone bottom crystallization of dissolver vessel (one of the reactants in wet process phosphoric acid manufacture is phosphate rock which is dissolved in the liquid portion of the slurry) generally represented at 10 is seen to have the conventional cone bottom 12 from the bottom of which a conduit 14 withdraws a slurry comprising a liquid portion and a precipitated solids portion in the direction of the arrows, through conduit 14 into evaporator-cooler 16.

A vacuum is imposed on evaporator-cooler 16 by a suitable vacuum pump or condenser means acting through conduit 18 and evacuating the atomsphere over the slurry level in the evaporator vessel as shown the the arrow 20. Liquid is evaporated from the surface 22 of the slurry in evaporator-cooler 16 and the slurry is cooled thereby. The slurry circulates in the general direction of the arrow shown within the evaporator-cooler 16 through conduit 24 and back into dissolver-crystallizer 10. Reactants are added through inlet conduits 26 and 28, in crystallizer-dissolver 10, and a spray of liquid reactants is shown being introduced through conduit 30 in evaporator-cooler 16. Crystallizer-dissolver 10 is open to the atmosphere via conduits 26 and 28 and/or vent 11.

The particular arrangement shown is typical for the phosphoric acid process taught in my U.S. Pat. Nos. 3,522,003 and 3,522,004, assigned to the assignee of the present application, in which case calcium phosphate-containing ground rock would be introduced through conduit 26, re-cycled phosphoric acid would be introduced through conduit 28 and a spray of sulfuric acid would be introduced into the vessel through conduit 30, via sprayhead 32. The slurry is maintained in circulating motion by circulating pump 34, and product slurry withdrawn at a convenient point such as conduit 15 or 15'.

The various embodiments illustrated in FIGS. 1, 2, 3, 4, and 6, show liquid reactant inlet 30 with sprayhead 32 and inlets 26 and 28, but it will be understood that more or fewer such inlets may be employed depending on the process involved, for introducing solid, liquid or mixed solid and liquid reactants. Also more or fewer outlets, such as 15 and 15' may be employed to withdraw product from the apparatus.

It will be appreciated that the use of at least one cone-bottom vessel is typical of crystallization processes and not limited to wet process phosphoric acid, although the details of conduits, valves, pump location, auxillary vessels, etc. will vary from process to process and indeed will vary according to different design criteria for a given process.

The vacuum imposed in evaporator-cooler 16 maintains a vacuum leg of slurry in evaporator-cooler 16 above the level of slurry in dissolver-crystallizer 10, the height $h$ of the vacuum leg being shown in the drawing. Conduits 14 and 24, respectively, enter vessel 16 and 10 tangentially so that the flow of slurry within the vessel is substantially rotational and laminar, descending downwardly through vessels 16 and 10, as shown schematically by the arrows therein.

It is seen that crystallizer-dissolver 10 is typically a cone bottomed vessel. In the particular prior art embodiment shown, the bottom of evaporator-cooler 16 also has a cone-shaped bottom. The height $c$ of the cone bottom of crystallizer 10, when added to the height $d$ of the slurry column in crystallizer 10, plus the height $f$ of the free board depth of the vessel, sets the vertical length $l$ of crystallizer-dissolver 10. The distance $t$ is required however, to allow room for the elbow of takeoff conduit 14 which withdraws slurry from the apex of cone 12. Thus, the distance $t$ must be added to the distance $l$ to obtain the total elevation $e$ required above grade for crystallizer 10.

The vacuum imposed on evaporator-cooler 16 will, as hereinabove noted, create a slurry vacuum leg of height $h$, above the surface 23 of slurry in crystallizer-dissolver 10. The total height above grade T of the system, that is, the height of the tallest portion thereof, is seen to be the sum of the height $g$ of slurry level 23 plus the height $h$ of the vacuum leg, plus the height $f$ of the free board of the evaporator or cooler vessel.

While the rendering shown in FIG. 1 is schematic and does not purport to be drawn to scale, it will be appreciated that crystallizer plants operate at very large capacities. For example, a 500 or 1,000 tons of $P_2O_5$ per day capacity in wet process phosphoric acid plants is not unusual, and in such plants the various vessels and conduits will aggregate to a total weight of several hundred tons. It will be appreciated that a large expenditure for supporting steel framework and foundations is required to insure the structural integrity of the equipment at the extended elevation shown. (For the sake of clarity in the illustration, the supporting structural steel work and foundations are not shown, since their configuration is of course obvious and well known to one skilled in the art.)

Figure 2:
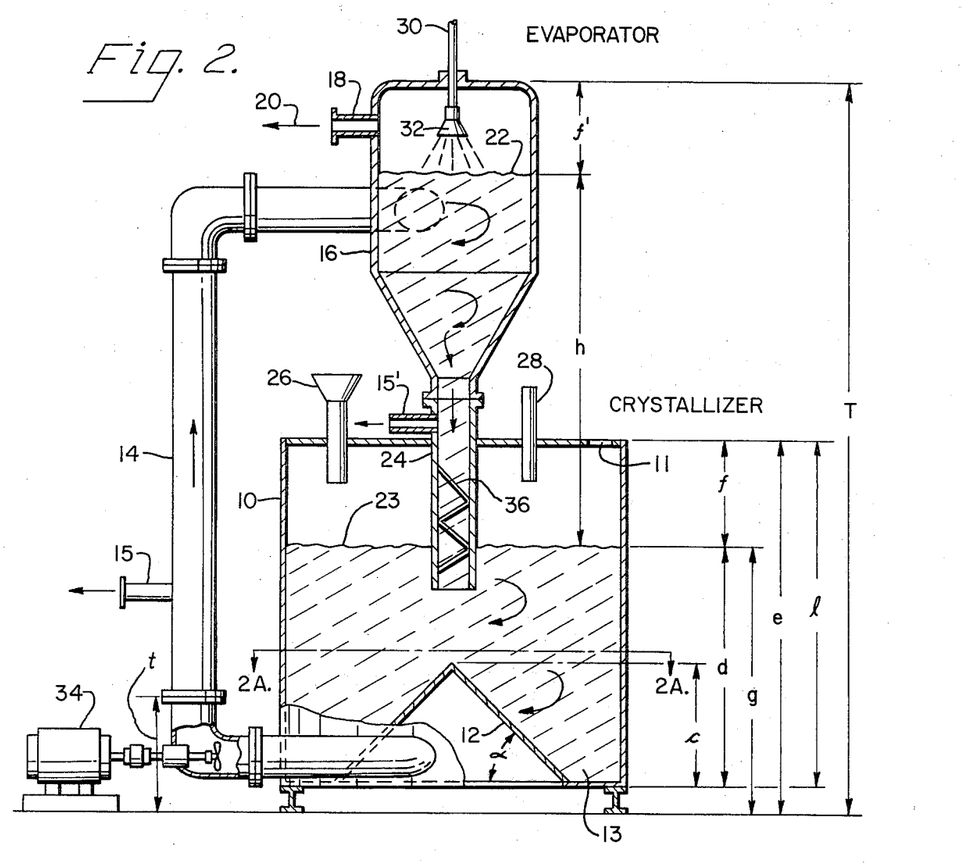
FIG. 2 is a schematic elevation view of one embodiment of the present invention.

Reference is now made to FIG. 2, which shows one embodiment of the invention, and in which parts of the crystallization system illustrated which are similar or analogous to the parts illustrated with respect to the embodiment of the prior art shown in FIG. 1 are identically numbered thereto.

In FIG. 2, crystallizer vessel 10 is shown to be substantially cylindrical in its outer dimensions, and because of the flat profile of its bottom portion, capable of being supported at ground level. The bottom portion of crystallizer 10 is further seen to be hollow, with a cone shaped bottom 12 extending upwardly and internally of the vessel.

The slurry is seen to circulate from dissolver or crystallizer vessel 10 by pump 34 via conduit 14 which enters evaporator 16 tangentially, thereby imparting a rotational laminar flow to the slurry passing through the evaporator. Evaporator 16 is evacuated via conduit 18 by a vacuum or other suitable means, the evacuation of atmosphere over the level of slurry 22 being indicated by the arrow 20. Slurry leaves evaporator 16 via conduit 24, the lower leg of which is seen to extend below the surface level 23 of the slurry in crystallizer 10. Conduit 24 is provided with a helical-shaped, internal screw 36 of gradual decreasing pitch which increases the rotational velocity of the slurry passing conduit 24 and discharges it into crystallizer 10 with a rotational, swirling motion. The slurry thus swirls around the surface of cone 12, which by its shape precludes the settling of crystals in a dead spot in the liquid vortex at the center of the crystallizer 10. The slurry and the solids contained therein are thus maintained in rotational motion about the cone and discharged via conduit 14 back up to evaporator 16. A portion of the slurry is withdrawn from the system as product from any convenient point, such as conduit 15 or 15'.

Depending on the particular process involved, it may be advantageous to recycle a portion of the withdrawn slurry, or a constituent thereof, to the process. For example, in the manufacture of phosphoric acid by the wet process, a portion of the circulating slurry is withdrawn, solid calcium sulfate crystals are separated from the withdrawn slurry by filtration, and the filtered crystals are washed to recover phosphoric acid values therefrom. The slurry filtrate, consisting of phosphoric acid, is withdrawn as product, and the dilute phosphoric acid recovered in the crystal wash solution is returned to the process for admixture with phosphate rock and sulfuric acid. It will be appreciated that the details of vessels and conduits corresponding to the specific process involved do not effect the utilization of the inwardly and upwardly projecting cone-shaped bottom of the invention.

In comparing the total height of the embodiment of FIG. 2 with that of the prior art as shown in FIG. 1, it is seen that the total height T is reduced by the height c of the cone 12, and the elbow distance t of takeoff conduit 14. Further reduction in overall height may be obtained as explained hereinbelow.

It should be noted that by making the crystallizer vessel somewhat greater in diameter as compared to the crystallizer of the prior art embodiment described in FIG. 1, equivalent capacity may be obtained in apparatus that is considerably shorter than the prior art apparatus.

Figure 2A:
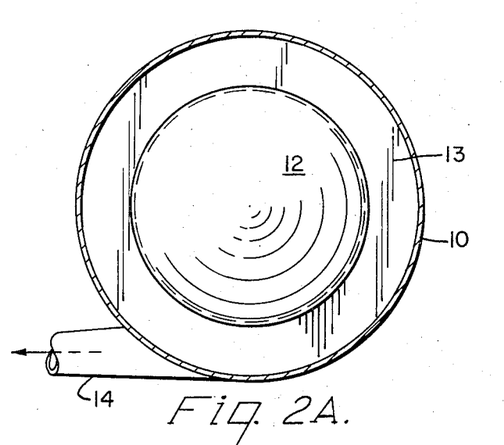
FIG. 2A is a section view along lines 2A—2A of FIG. 2.

It should be further noted that the base of cone 12 is of smaller diameter than is the crystallizer vessel 10, so that an annular space 13 is provided at the bottom of crystallizer 10. This annular space insures adequate flow into takeoff conduit 14, as is best seen with respect to FIG. 2A, in which the direction of slurry flow is indicated by the arrows and in which annular space 13, formed at the bottom of crystallizer 10 between cone 12 and the walls of crystallizer vessel 10, permits unimpeded slurry flow into takeoff conduit 14. Takeoff conduit 14 is arranged substantially tangentially to the diameter of crystallizer vessel 10.

Figures 3, 3A:
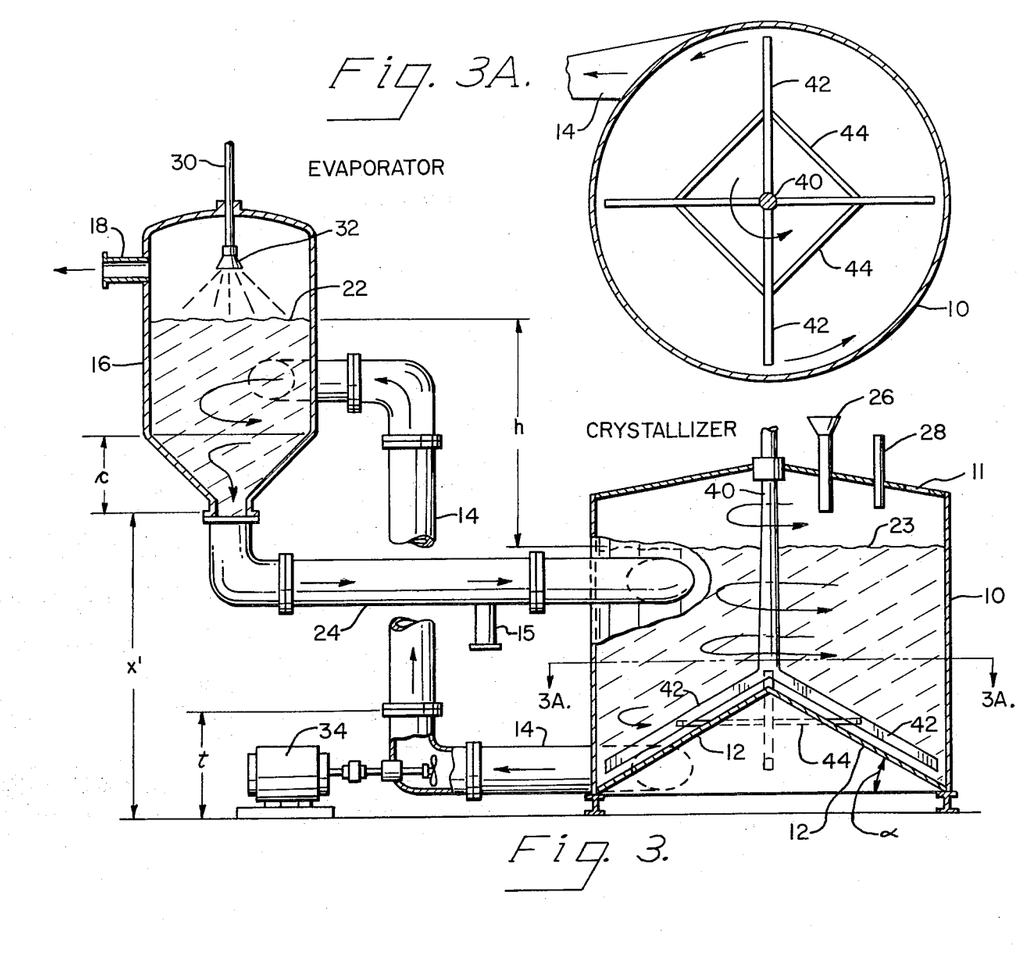
FIG. 3 is a schematic elevation view of yet another embodiment of the invention.
FIG. 3A is a section view along lines 3A—3A of FIG. 3.

Referring now to FIG. 3, which is a schematic elevational view of yet another embodiment of the invention, crystallizer vessel 10 is seen to be provided with the inwardly and upwardly projecting interior cone 12. Cone 12 projects from the horizontal at an angle $\alpha$ (alpha) which is preferably between 30° and 60°, and in the case shown is at its minimum preferred value of 30°, to displace as little volume as possible from crystallizer 10. Because of the shallowness of cone 12, a rake mechanism consisting of a shaft 40 and rake arms 42 is provided. The rake is rotated by a motor drive, not shown, and rotates in the same direction as the swirling slurry, as indicated by the arrow. Rake 40 is rotated at a speed at least as great, and preferably slightly in excess of the rotational speed of the slurry around the cone 12, so that the laminar helical flow of the slurry is not disturbed by having to pass over the rake arms. The stirring action of the rake helps to maintain the solids in suspension and precludes their settling out in the crystallizer 10 on the surface of 12. While the rake stirrer may be employed with any embodiment of the invention, it is most advantageously employed when, as in the case shown, the angle $\alpha$ (alpha) is low or at the low end of the preferred range of between 30° and 60°. The relatively shallow cone is less effective than a steep cone in dispersing the crystals and may require the assistance of a rake to maintain the solids in suspension.

FIG. 3A is a plan view of crystallizer 10 and shows rake arms 42 extending from shaft 40. Four rake arms are shown although it will be appreciated that there may be fewer or more such arms. Generally, a minimum of two such arms is preferred and sufficient but more arms may be required if support braces 44 are employed. Support braces 44 may be required if the diameter of crystallizer 10 is so large that additional support is necessary to prevent the rake arms from fluttering. It is to be borne in mind that it is not desired to agitate the slurry, since such agitation would cause backmixing and loss of control of the laminar flow of the slurry. Accordingly, when the diameter of the crystallizer is large, struts 44 are employed to reinforce the rake arms. In such case, there must be a sufficient number of rake arms so that the struts 44 will clear the surface of cone 12 as the stirrer rotates.

It is also to be noted that in this embodiment of the invention, there is no annular space between the base of cone 12 and crystallizer 10. As in the other embodiments, the overall height of crystallizer 10 is seen to be reduced by virtue of the fact that the height of cone 12 is contained within the height of the vessel 10 and elevation over the elbow of takeout conduit 14 is not required.

Figure 3B:
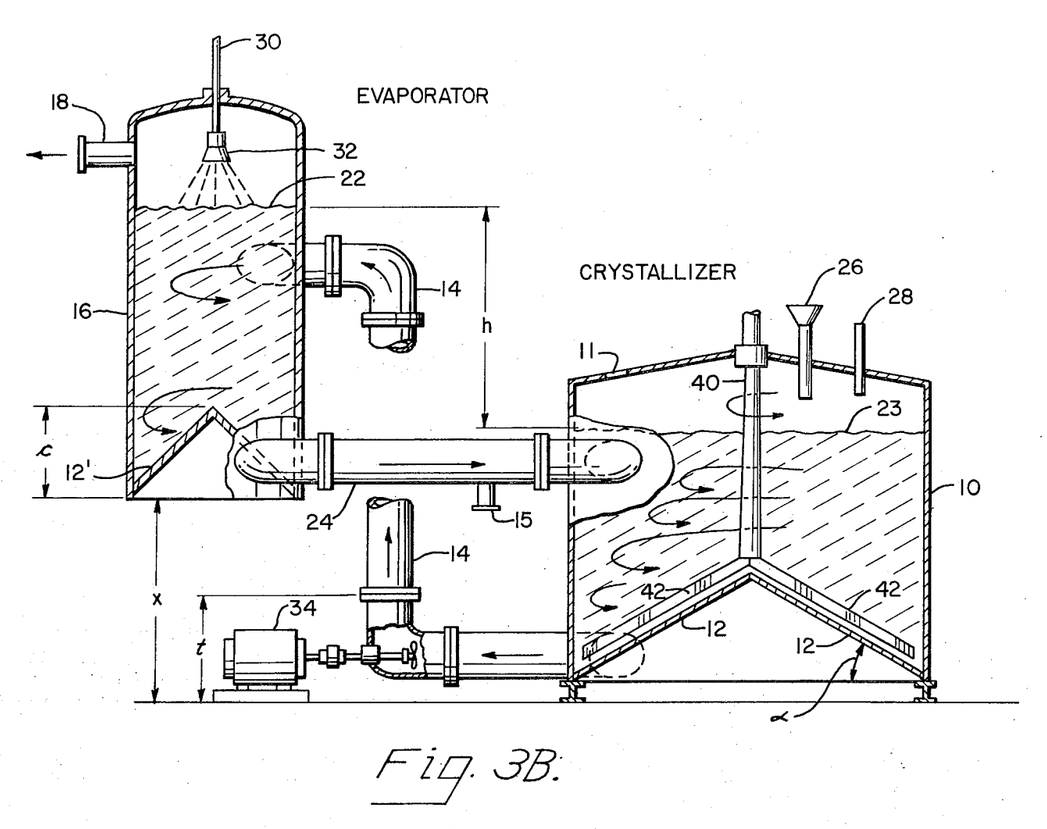
FIG. 3B is a schematic elevation view of a modification of the embodiment of FIG. 3.

FIG. 3B shows a modified version of the embodiment of FIG. 3, wherein the evaporator, like the crystallizer, is formed with an inverted cone surface bottom. Comparison of FIGS. 3 and 3B readily illustrates the savings in overall equipment height which may be effected when the cooler (in the embodiment illustrated, an evaporative cooler) as well as the crystallizer is provided with the inverted cone surface bottom of the invention. In FIG. 3B, the height $x$ of the bottom of evaporator 16 above grade is seen to be considerably less than the corresponding height $x'$ in FIG. 3. Of greater significance is the fact that while the height $h$ of the slurry vacuum leg in the apparatus of FIG. 3 must be greater than the height $c$ of the cone, the apparatus of FIG. 3B is not so limited. The height $h$ is determined, for a given liquid, by the amount of vacuum imposed which in turn sets the boiling temperature. In a given process, the optimum design may call for a cone bottom of, say, 20 feet in height whereas the amount of vacuum called for will impose a vacuum leg of only 18 feet. In such a case, the optimum design must be departed from in the case of prior art apparatus in order that the slurry at least fills the cone bottom of the vessel. This difficulty is obviated by the inverted cone of the invention, which effectively eliminates the interdependency of cone height and vacuum leg as a design factor. The two embodiments shown are otherwise identical, except that in FIG. 3B a two-arm rake is illustrated within crystallizer 10.

With reference to FIG. 3B, cone surface bottom 12' is located within cooler 16. Conduit 24 is positioned tangentially with respect to the circumference of the wall of cooler 16 and slurry flows from cooler 16 into conduit 24, the take off portion of which need not be lower than the bottom of cooler 16.

Figure 4:
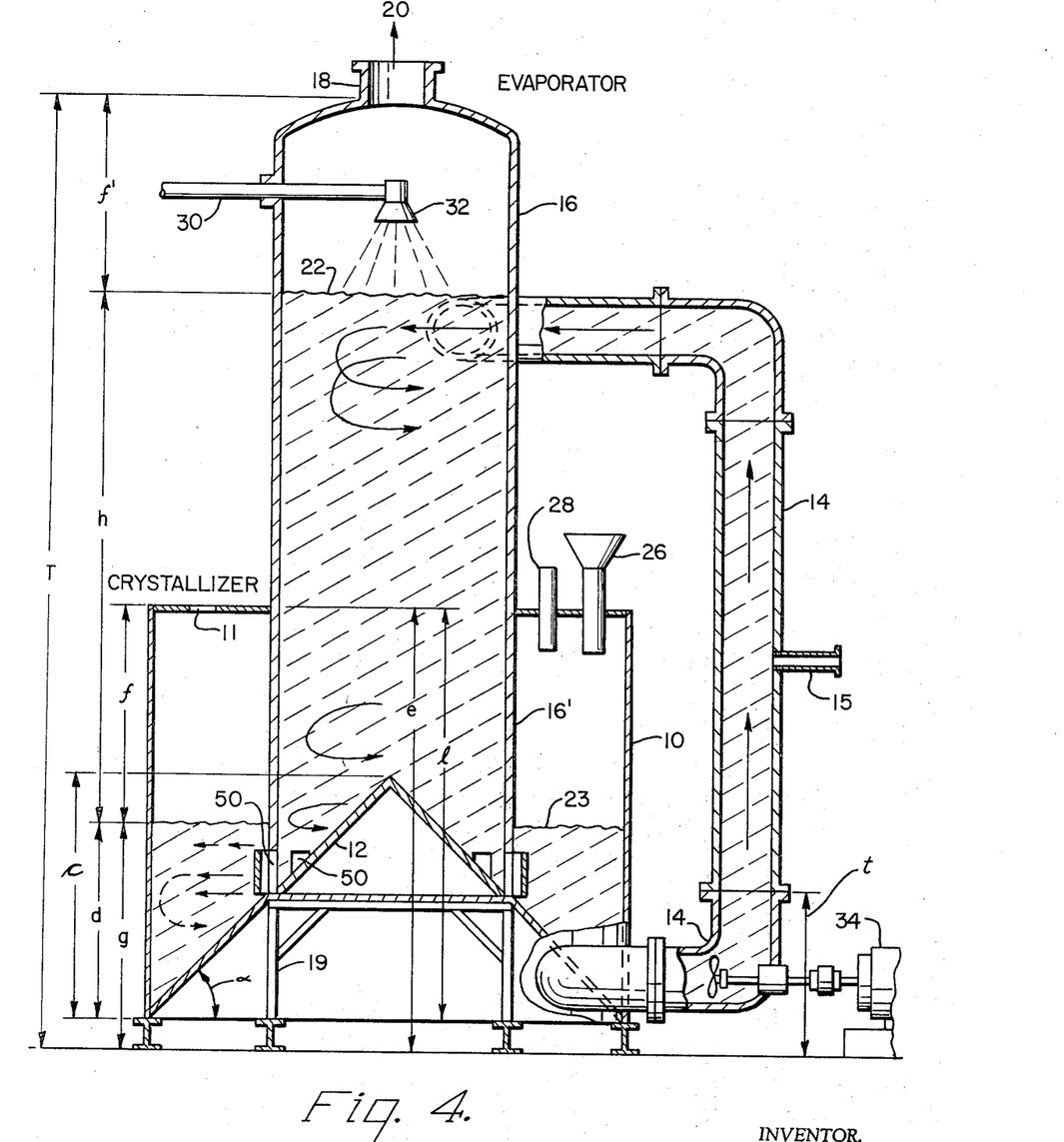
FIG. 4 shows a schematic elevation view of yet another embodiment of the invention.

Referring now to FIG. 4, which shows an elevational schematic view of still another embodiment of the invention in which evaporator cooler vessel 16 is positioned so that the lower portion thereof extends within crystallizer 10 and below the surface of the slurry 23 therein. In this manner, a further reduction in overall height is attained by eliminating the down leg or conduit between evaporator 16 and crystallizer 10. A vacuum is imposed on vacuum evaporator 16 by evacuation of the atmosphere via conduit 18 in the direction of the arrow 20. The slurry is circulated by pump 34 and enters evaporator 16 tangentially to provide a swirling motion as shown by the arrows. As aforesaid, in this embodiment there is not conduit per se connecting evaporator 16 with vessel 10, but the lower portion of 16' of evaporator vessel 16 is seen to be placed within crystallizer 10 and beneath the surface 23 of the slurry contained therein. In this embodiment evaporator-cooler 16 rests directly on cone 12 of vessel 10 and is supported thereby. Suitable reinforcement members 19 may be provided to help sustain the weight of evaporator 16.

As the slurry descends in laminar flow down evaporator 16, it emerges through slots 50, which are generally vertically positioned slots provided circumferentially around the lower portion of evaporator-cooler vessel 16.

Figure 4A:
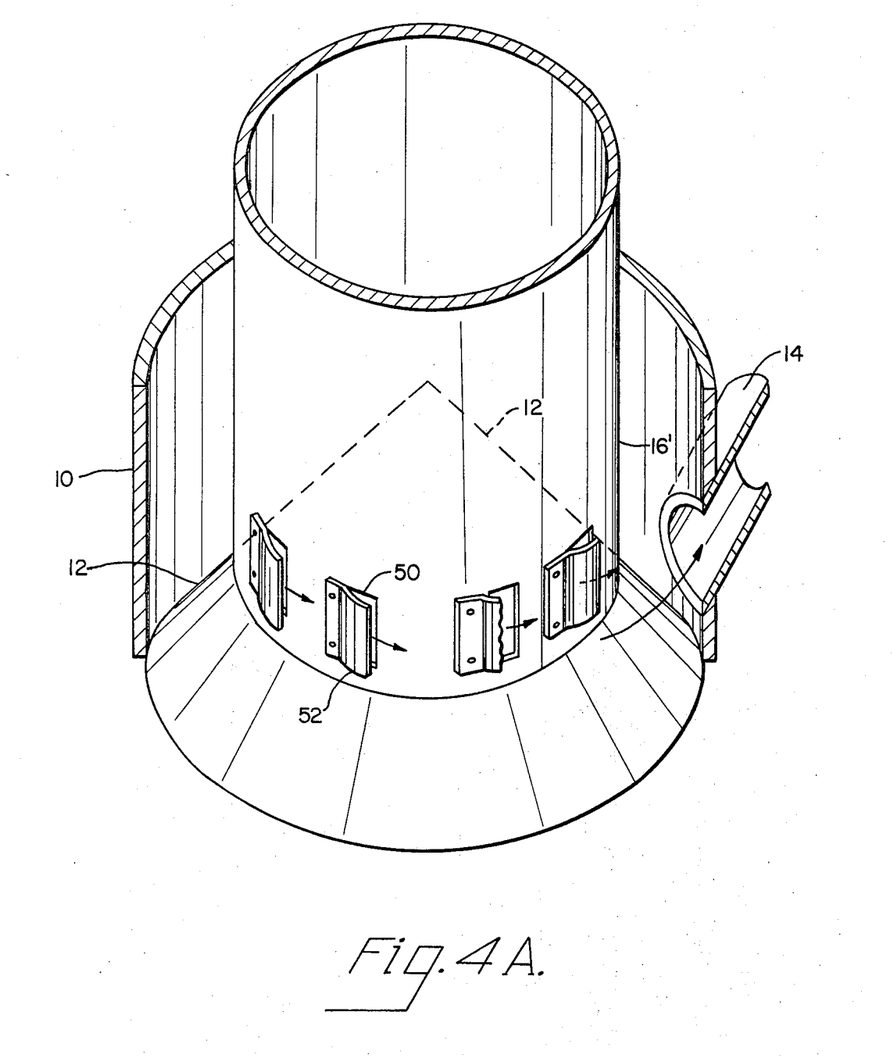
FIG. 4A shows a perspective, partial section view of the lower portion of evaporator 16 in FIG. 4.

FIG. 4A represents a perspective partial section view of the embodiment of FIG. 4 at the point where evaporator-cooler 16 meets cone 12, the diagram of FIG. 4A being in larger scale than that of FIG. 4 and showing a sectional, perspective view. Referring now to FIG. 4A, the upper part of cone 12 is surrounded by the lower portion 16' of evaporator-cooler 16. A series of vertical slots 50 are cut in the periphery of the lower portion 16' of evaporator-cooler 16. Slurry passing from evaporator 16 emerges through slots 50 in the direction shown by the arrows. Louvers 52 are provided adjacent each slot to direct the flow of emerging slurry in a generally rotational, tangential direction to the base of evaporator vessel 16. Louvers 52 are shown suitably supported at the periphery of evaporator vessel 16. Parts of the louvers are broken away in the illustration in FIG. 4A to clearly show the slots 50.

The slurry is withdrawn via conduit 14, and then passed upwardly towards the top of evaporator vessel 16, as best seen in FIG. 4.

A portion of the slurry may be removed from the process at any suitable location as via conduit 15 (FIG. 4). The embodiment of FIGS. 4 and 4A is particularly advantageous in that the length of the conduit or downleg between the evaporator and the crystallizer vessel is eliminated, and both the cone and the portion of the evaporator which is below the level of the slurry in crystallizer 10 are fitted within the height of crystallizer 10, thereby effecting a considerable savings in overall height and associated structural steel supports.

Although the louvers 52 preclude undue disruption of the laminar rotational flow of the slurry by injecting the slurry into crystallizer 10 in a tangential fashion, the injection of the slurry from evaporator 16 directly over the surface of cone 12, may tend to interfere with the suction of the pump 34. This may be overcome by providing a configuration of conduit 14 as shown in the partial section views of FIGS. 5 and 5A.

Figure 5:
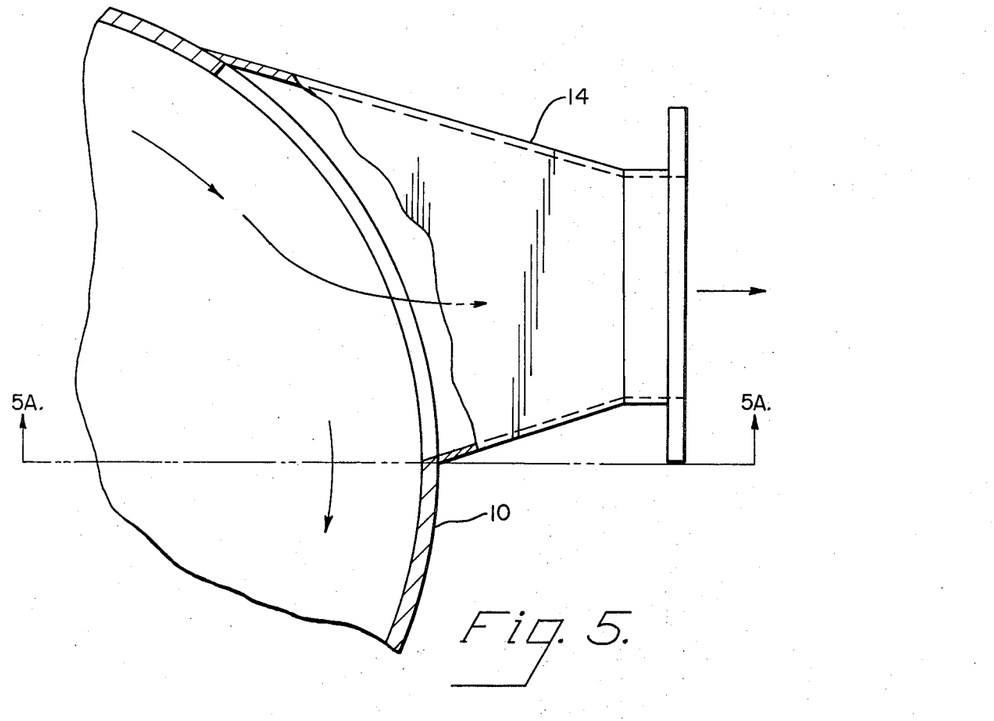
FIG. 5 shows a partial plan view of the embodiment of FIG. 4.

Referring now to FIG. 5, there is shown in partial section a plan view showing the conduit 14 and a section of crystallizer 10. Conduit 14 is seen in plan view to have a flared configuration with the slurry moving in the direction shown by the arrows.

Figure 5A:
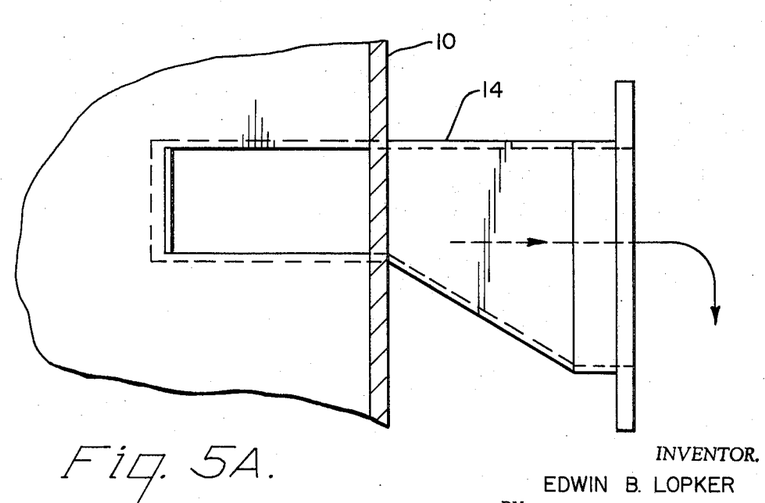
FIG. 5A shows a partial elevation view of the embodiment of FIG. 4.

As shown in FIG. 5A, which represents an elevation view along the same section of the apparatus as shown in FIG. 5, conduit 14 is flared also in the vertical direction, thereby providing an expanded cross sectional area, and an expanded entry area into conduit 14, which overcomes the otherwise disruptive effect on the pump suction of the tangentially injected slurry at the surface of the cone.

Figures 6, 6A:
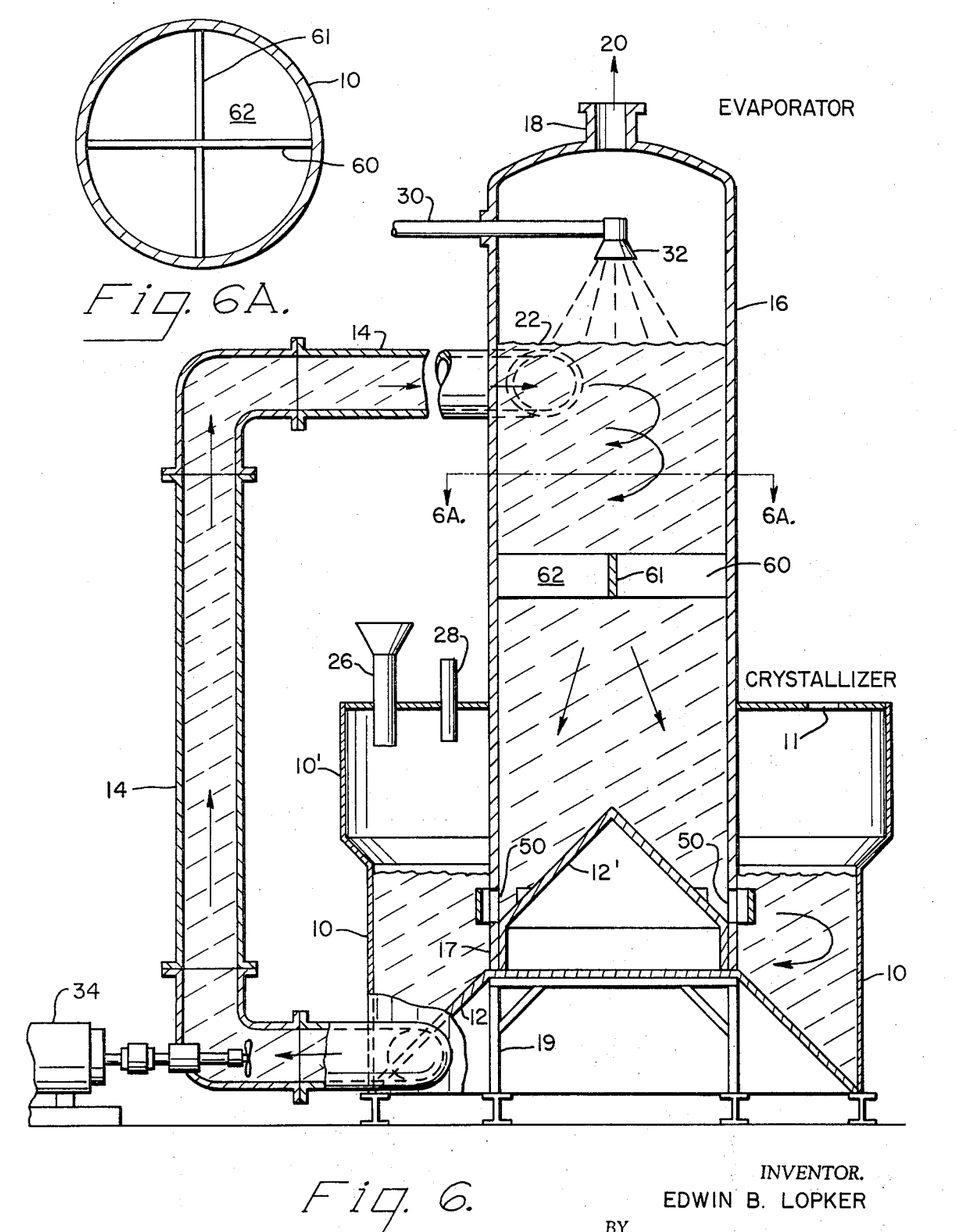
FIG. 6 is a schematic elevation view of yet another embodiment of the present invention.
FIG. 6A is a section view along lines 6A — 6A of FIG. 6.

Referring now to FIG. 6, which shows yet another embodiment of the invention, crystallizer vessel 10 is seen to be expanded at its upper portion so that upon shutdown of the equipment the additional storage capacity may be used to hold the slurry which will descend from evaporator 16 upon removal of the vacuum therein.

Another feature illustrated in the embodiment of FIG. 6 is that the bottom portion of evaporator-cooler vessel 16 contains a cone surface 12' which is not contiguous with the cone surface 12 formed at the bottom of crystallizer vessel 10. A substantially cylindrical section 17 is seen to connect the two cone sections 12 and 12', cone 12 being truncated and the cylindrical section 17 extending from the truncated portion of cone 12. Interior supporting steelwork 19 is utilized to help in supporting the evaporator 16.

Placing evaporator 16 directly over cone 12 and thereby withdrawing the slurry from evaporator 16 directly over the surface of cone 12 tends to create a strong swirling or vortex action within evaporator 16. When an excessively strong vortex is created, the very problem of crystal capture, which cone 12 is designed to prevent in crystallizer 10, may occur in evaporator 16. This may be overcome by providing a vortex-or swirl-breaker within evaporator 16. The swirl-breaker is simply a baffle plate which disrupts the swirling action somewhat. Thus, the swirl-breaker eliminates the excessive vortexing and helps to overcome the crystal capture problem.

As shown in FIGS. 6 and 6A, swirl-breaker 62 is essentially a pair of vertically positioned, intersecting plates which extend across the diameter of evaporator vessel 16. A second plate 61 is positioned substanitially perpendicular to first plate 62 so that in plan view, as best seen in FIG. 6A, a cruciform baffle is provided by the swirl-breaker which tends to reduce the swirling action of the slurry as it passes in laminar flow downwardly through evaporator 16. It should be noted that the swirl-breaker does not completely eliminate the rotating laminar motion which is desired, but simply prevents that motion from attaining velocities which would cause an undesirable vortexing of the slurry with consequent retention of crystals above the cone in the center of evaporator cooler vessel 16.

The invention has been described in detail with reference to the specific embodiments illustrated, which are for purposes of illustration only and not for purposes of limitation.

It will be apparent that upon a reading and understanding of the foregoing specification, obvious alterations and modifications to the described embodiments of the invention may be made which alterations and modifications are within the scope and spirit of the present invention. It is intended to include all such alterations and modifications within the scope of the appended claims or the equivalents thereof.

What is claimed is:

1. A crystallizer apparatus adapted to pass a slurry therethrough, comprising:

a crystallizer vessel having inlet means adapted to add reactants and having a truncated cone projecting from the lowermost portion of the vessel upwardly into the interior thereof at an angle from about 30° to about 60° from the horizontal, the cone being a major part of the vessel bottom surface;

slurry outlet means at the lower portion of the vessel;

an evaporative cooler substantially concentric with the vessel having the lower portion of the cooler in contact with the truncated cone below the level of slurry in the vessel, and, having inlet means adapted to add reactants;

slurry outlet means at the lower portion of the cooler adapted to impart helical flow to slurry passing from the cooler to the vessel;

slurry inlet means located on the cooler at a point above the outlet means; and a conduit interconnecting the vessel outlet means with the cooler inlet means.

2. The apparatus of claim 1 wherein a major part of the bottom surface of the evaporative cooler is a cone projecting from the lowermost portion of the cooler upwardly into the interior thereof at an angle of from about 30° to about 60° from the horizontal.

3. The apparatus of claim 1 wherein the cooler inlet means are adapted to impart helical flow to slurry passing from the vessel to the cooler.

4. The apparatus of claim 1 wherein the slurry outlet means at the lower portion of the cooler comprise apertures having louvres positioned over the apertures.

5. The apparatus of claim 1 wherein a swirlbreaker is located within the evaporative cooler.

6. The apparatus of claim 1 wherein substantially all of the bottom surface of the crystallizer vessel is a truncated cone.

\* \* \* \* \*